United States Patent
Rebhan et al.

(10) Patent No.: US 8,413,440 B2
(45) Date of Patent: Apr. 9, 2013

(54) FRESH GAS SUPPLY DEVICE FOR AN INTERNAL COMBUSTION ENGINE HAVING AN EXHAUST GAS TURBOCHARGER, AND METHOD FOR THE CONTROL THEREOF

(75) Inventors: Stephan Rebhan, Munich (DE); Niklas Ulrich, Munich (DE); Andras Sipos, Budapest (HU); Mark Lelkes, Budapest (HU); Tamas Dohany, Pecs (HU); Gabor Lorant, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 65 days.

(21) Appl. No.: 13/050,717

(22) Filed: Mar. 17, 2011

(65) Prior Publication Data

US 2011/0252784 A1 Oct. 20, 2011

Related U.S. Application Data (63) Continuation of application No. PCT/EP2009/006729, filed on Sep. 17, 2009.

(30) Foreign Application Priority Data

Sep. 17, 2008 (DE) .......................... 10 2008 047 802

(51) Int. Cl.
 F02B 33/44 (2006.01)
 F02B 37/00 (2006.01)
 F02B 37/04 (2006.01)
(52) U.S. Cl. ........................................ 60/611; 60/605.1

(58) Field of Classification Search .................. 60/611, 60/605.1, 329, 489, 420; F02B 37/00, 37/04, F02B 33/44, 21/00; F02D 23/02, 23/00
See application file for complete search history.

(56) References Cited

U.S. PATENT DOCUMENTS

| | | | | |
|---|---|---|---|---|
| 2,277,930 A | * | 3/1942 | Mock et al. | 123/460 |
| 5,064,423 A | * | 11/1991 | Lorenz et al. | 60/611 |
| 5,636,619 A | * | 6/1997 | Poola et al. | 123/585 |
| 6,539,714 B1 | * | 4/2003 | Wang | 60/611 |

(Continued)

FOREIGN PATENT DOCUMENTS

| | | |
|---|---|---|
| DE | 1 192 836 B | 5/1965 |
| DE | 16 00 749 C3 | 1/1970 |

(Continued)

OTHER PUBLICATIONS

A Machine translation of Nemeth et al. (Pub. No. DE 102006008785 A1), published on Mar. 15, 2007.*

(Continued)

*Primary Examiner* — Thai Ba Trieu
(74) *Attorney, Agent, or Firm* — Crowell & Moring LLP (57) ABSTRACT

A fresh gas supply device is provided for an internal combustion engine having a turbocharger. The device includes a charge-air inlet for taking in charge-air from the exhaust gas turbocharger, a compressed air inlet for taking in compressed air, an outlet connectable to the charge-air inlet via a flap element and to the compressed air inlet via a flow regulating device, and a control unit for controlling the flap element and the flow regulating device. The flow regulating device has at least one valve for opening and closing the compressed air inlet and a proportional valve connected downstream in the direction of flow for setting a pressure in the outlet.

24 Claims, 6 Drawing Sheets

U.S. PATENT DOCUMENTS

| | | | |
|---|---|---|---|
| 6,729,315 B2* | 5/2004 | Onodera et al. | 123/568.21 |
| 6,945,234 B2* | 9/2005 | Bleile et al. | 60/611 |
| 7,155,907 B2* | 1/2007 | Desjardins et al. | 60/420 |
| 7,398,149 B2* | 7/2008 | Ueno et al. | 60/611 |
| 7,665,302 B2* | 2/2010 | Nemeth et al. | 60/605.1 |
| 7,685,819 B2* | 3/2010 | Vetrovec | 60/611 |
| 7,762,069 B2* | 7/2010 | Gerum | 60/611 |
| 7,866,156 B2* | 1/2011 | Nemeth et al. | 60/605.1 |
| 2005/0217260 A1* | 10/2005 | Desjardins et al. | 60/421 |
| 2007/0246008 A1* | 10/2007 | Gerum | 123/316 |
| 2009/0217661 A1* | 9/2009 | Gruel | 60/602 |
| 2012/0144826 A1* | 6/2012 | Rebhan et al. | 60/611 |

FOREIGN PATENT DOCUMENTS

| | | | |
|---|---|---|---|
| DE | 101 22 297 C1 | | 6/2002 |
| DE | 10 2004 047 975 A1 | | 4/2006 |
| DE | 10 2006 008 785 A1 | | 3/2007 |
| JP | 59101539 A | * | 6/1984 |
| JP | 07091267 A | * | 4/1995 |
| WO | WO 2005/064134 A1 | | 7/2005 |

OTHER PUBLICATIONS

A Machine translation of Ohmer et al. (Pub. No. DE 10122297 C1), published on Jun. 27, 2006.*

Ebertshaeuser, H.; Fluidtechnik von A bis Z, Fluid Power Engineering from A to Z. Mainz: Vereinigte Fachverlage, 1989, pp. 250 to 254, 290 and 311.

Klaus, G.; Liebscher, H.:, Systeme Informationen Strategien. Eine Einfuehrung in die kybernetischen Grundgedanken der System- und Regelungstheorie, Informationstheorie und Spieltheorie, Systems Information Strategies. An Introduction to the Cybernetic Principles of System and Control Theory, Information Theory and Game Theory. Berlin: VEB Verlag Technik, 1974, pp. 91 to 94, 98 and 99.

German Office Action dated Jan. 18, 2010, with English translaton (ten (10) pages).

International Search Report dated Feb. 17, 2010 with English translation (eight (8) pages).

* cited by examiner

— Air
-- Exhaust gas
≡≡ mechanical coupling

PRIOR ART

FRESH GAS SUPPLY DEVICE FOR AN INTERNAL COMBUSTION ENGINE HAVING AN EXHAUST GAS TURBOCHARGER, AND METHOD FOR THE CONTROL THEREOF

CROSS-REFERENCE TO RELATED APPLICATIONS

This application is a continuation of PCT International Application No. PCT/EP2009/006729, filed Sep. 17, 2009, which claims priority under 35 U.S.C. §119 from German Patent Application No. DE 10 2008 047 802.4, filed Sep. 17, 2008, the entire disclosures of which are herein expressly incorporated by reference.

BACKGROUND AND SUMMARY OF THE INVENTION

The invention relates to a fresh-gas supply device for an internal combustion engine having an exhaust-gas turbocharger and to a method for regulating an outlet pressure of a fresh-gas supply device of such a type.

Figure 1:
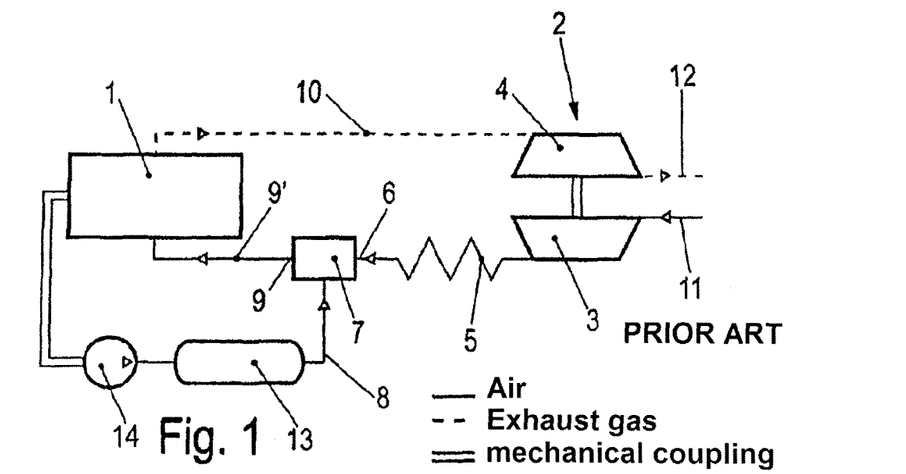
FIG. 1 is a schematic illustration of an internal combustion engine having an exhaust-gas turbocharger and having a fresh-gas supply device.

Internal combustion engines, such as for example diesel engines, are often fitted with exhaust-gas turbochargers. In this regard, FIG. 1 shows a schematic illustration of an internal combustion engine 1, the exhaust line 10 of which is coupled to an exhaust-gas turbocharger 2. The exhaust-gas turbocharger has a turbine 4 which is driven by exhaust gas and which is coupled to a compressor 3. The compressor 3 compresses intake air from an intake air inlet 11 in order to increase an intake pressure in an intake line 9' for the internal combustion engine 1, as a result of which, for example, acceleration of the vehicle having the internal combustion engine 1 and a reduction in the energy consumption are obtained.

However, the exhaust-gas turbocharger 2 cannot deliver a sufficient quantity of air, and therefore cannot generate a sufficient intake pressure, in all operating states of the internal combustion engine 1. For example, piston engines such as diesel engines having an exhaust-gas turbocharger 2 have, for example, an operating state during acceleration which is referred to as "turbo lag". Here, the internal combustion engine 1 reacts with a rotational speed increase only after a certain time delay after the accelerator pedal is pressed, during which time delay no exhaust-gas energy is available, that is to say also no sufficient exhaust-gas pressure is available for driving the exhaust-gas turbocharger 2, and therefore no compressed intake air with a corresponding intake pressure is available. To bridge this "turbo lag", solutions have been proposed in which compressed air, for example from a tank 13, which is fed by an air compressor 14, is introduced in a controlled fashion into the intake line 9' of the internal combustion engine 1 in order, in the event of an increased intake air demand of the internal combustion engine 1, to cover the demand. This takes place by way of a fresh-gas supply device 7, which is arranged between the compressor 3 of the turbocharger, or a charge-air cooler 5 which is connected downstream in the flow direction, and the intake line 9'.

Figure 2:
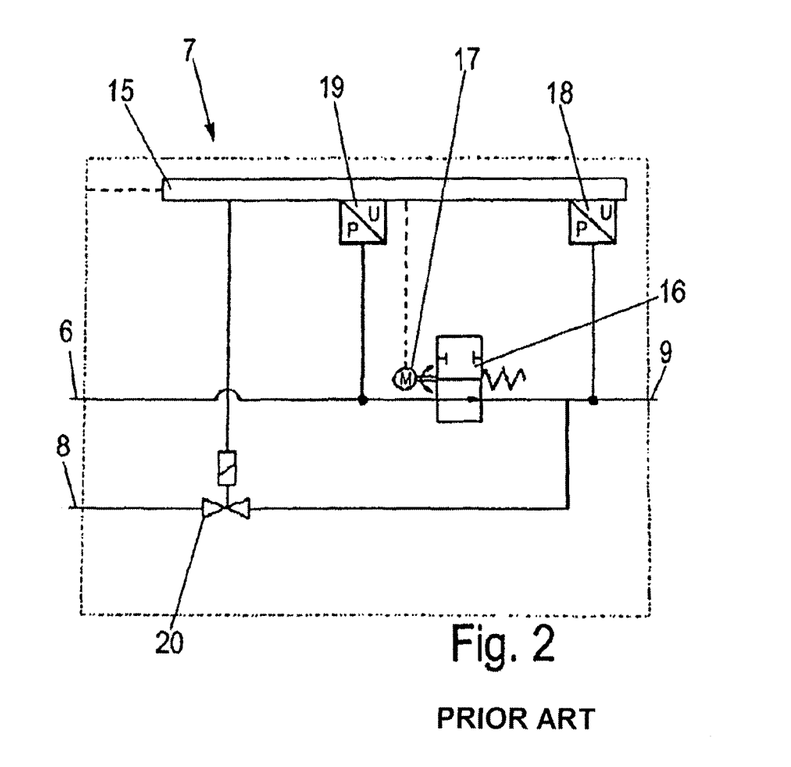
FIG. 2 is a schematic block circuit diagram of a conventional fresh-gas supply device.

A fresh-gas supply device 7 is illustrated schematically in FIG. 2. The fresh-gas supply device 7 is connected with a charge-air inlet 6 to the charge-air cooler 5 and with an outlet 9 to the intake line 9'. A flap element 16 is situated between the charge-air inlet 6 and the outlet 9, which flap element 16 can be adjusted by an adjusting motor 17 in order to close off and open the connection from the charge-air inlet 6 to the outlet 9. Furthermore, a compressed-air inlet 8 is connected to the outlet 9 and, via a flow-regulating device 20, to the tank 13.

A control device 15 serves to control the flow-regulating device 20 and the adjusting motor 17. The control device 15 is also connected here to pressure sensors 18 and 19, of which a first pressure sensor 18 measures a pressure of the outlet 9 (outlet pressure) and a second pressure sensor 19 measures a pressure of the charge-air inlet 6 (inlet pressure) and detects a torque demand in the event of a "kick-down". In this case, the flow-regulating device 20 supplies compressed air by opening the connection from the compressed-air inlet 8 to the outlet 9. The controlled flap element 16 is firstly closed, such that the compressed air does not flow via the charge-air inlet 6 into the compressor 3 of the exhaust-gas turbocharger 2 counter to the intake direction, but rather flows via the outlet 9 into the intake line 9'. When the supply of compressed air is ended, the flap element 16 is opened again and the flow-regulating device 20 is closed. At that time, the inlet pressure is sufficient again as a result of the compressor 3 of the exhaust-gas turbocharger 2.

In this regard, the German laid-open specification DE 10 2006 785 A1 describes an example by way of illustration.

The outlet pressure is adjusted by means of the supply of compressed air, in such a way that no smoke formation can take place on account of an excessively enriched fuel/air mixture. In this way, it is possible to generate a leaner fuel/air mixture than is required, in particular at the start of the supply of compressed air. Consequently, more air is consumed than is required. This can lead to increased power of the air compressor 14 and to additional NOx formation.

It is therefore an object of the present invention to provide an improved fresh-gas supply device and a method for regulating an outlet pressure of a fresh-gas supply device of the above-mentioned type, with the above disadvantages being eliminated or significantly reduced, and with further advantages being created.

According to the invention, a fresh-gas supply device is provided for an internal combustion engine having an exhaust-gas turbocharger comprising a charge-air inlet for the admission of charge air from the exhaust-gas turbocharger; a compressed-air inlet for the admission of compressed air; an outlet which can be connected via an adjusting device, preferably via a flap element, to the charge-air inlet and via a flow-regulating device, which has a closed position and preferably any desired open positions, to the compressed air-inlet, which the flow-regulating device being closed when the flap element is partially open or fully open; and a control device for controlling the adjusting device, preferably the flap element, and the flow-regulating device as a function of operating states of the internal combustion engine, wherein the flow-regulating device has at least one valve for opening and for closing off the compressed-air inlet and has a proportional valve, which is connected downstream in the flow direction, for adjusting an outlet pressure in the outlet.

Further according to the invention, a fresh-gas supply device is provided for an internal combustion engine having an exhaust-gas turbocharger, comprising: a charge-air inlet for the admission of charge air from the exhaust-gas turbocharger; a compressed-air inlet for the admission of compressed air; an outlet which can be connected via an adjusting device, preferably a flap element, to the charge-air inlet and via a flow-regulating device, which has a closed position and any desired open positions, to the compressed-air inlet, with the flow-regulating device being closed when the adjusting device, preferably the flap element, is partially open or fully open; and a control device for controlling the flap element and the flow-regulating device as a function of operating states of the internal combustion engine, wherein the flow-regulating device has at least two valves for opening and for closing off the compressed-air inlet and for adjusting the outlet pressure in the outlet, and with it being possible for the at least two valves to be controlled separately by the control device via in each case one control valve.

Still further according to the invention, a method is provided for regulating an outlet pressure in an outlet of a fresh-gas supply device, the method comprising the steps of: (a) determining an inlet pressure in a charge-air inlet and an outlet pressure in the outlet of the fresh-gas supply device, and operating parameters of an operating state of the internal combustion engine; (b) blocking the connection of the outlet to the charge-air inlet by closing the adjusting device, preferably the flap element, if one determined operating parameter or a plurality require an increased acceleration of the internal combustion engine; (c) opening the connection of the outlet to the compressed-air inlet by opening the at least one valve and the proportional valve during a pressure build-up phase and regulating the outlet pressure by comparing the outlet pressure with a nominal pressure by adjusting the proportional valve during a pressure-regulating phase; and (d) closing the connection of the outlet to the compressed-air inlet by closing the at least one valve and the proportional valve and opening the connection of the outlet to the charge-air inlet by opening the adjusting device, preferably the flap element, if the inlet pressure has reached a defined and parameterizable value.

Yet still further according to the invention, a method is provided for regulating an outlet pressure in an outlet of a fresh-gas supply device the method comprising the steps of: (a) determining operating parameters of an operating state of the internal combustion engine; (b) blocking the connection of the outlet to the charge-air inlet by closing the adjusting device, preferably the flap element, if one determined operating parameter or a plurality require an acceleration of the internal combustion engine; (c) opening the connection of the outlet to the compressed-air inlet by fully opening the at least two valves in a pressure build-up phase and regulating the outlet pressure by comparing said pressure with a nominal pressure during a pressure-regulating phase by separately opening and closing the at least two valves or by adjusting at least one of the at least two valves between an open and closed position; and (d) closing the connection of the outlet to the compressed-air inlet by closing the at least two valves and opening the connection of the outlet to the charge-air inlet by opening the adjusting device, preferably the flap element, if the inlet pressure has reached a defined and parameterizable value.

By use of the at least one valve and the proportional valve connected downstream, it is advantageously possible for the supply of compressed air to be enabled quickly initially, with the proportional valve then being used to regulate the outlet pressure by means of adjustment. Here, there is no excess of pressure, and the fuel/air mixture can advantageously be set to the value required at a respective operating state. The at least one valve is designed to seal off a higher pressure than the proportional valve, as a result of which the proportional valve can be designed to be smaller.

In an alternative design, the fresh-gas supply device for an internal combustion engine having an exhaust-gas turbocharger has the following: a charge-air inlet for the admission of charge air from the exhaust-gas turbocharger; a compressed-air inlet for the admission of compressed air; an outlet which can be connected via a flap element to the charge-air inlet and via a flow-regulating device, which has a closed position and any desired open positions, to the compressed-air inlet, with the flow-regulating device being closed when the adjusting device, preferably the flap element, is partially open or fully open; and a control device for controlling the adjusting device, preferably the flap element, and the flow-regulating device as a function of operating states of the internal combustion engine, with the flow-regulating device having at least two valves for opening and for closing off the compressed-air inlet and for adjusting an outlet pressure in the outlet, and with it being possible for the at least two valves to be controlled separately by the control device via in each case one control valve.

By use of at least two valves, it is advantageously possible to carry out a multi-stage adjustment of the outlet pressure, with it being possible for the valves to be controlled separately via control valves. Here, the valves may have equal or different flow cross sections, thereby enabling flexible adaptation to an adjustment of the required outlet pressure. Here, it is possible for both the activation time and also the number of activated valves to be varied.

In one preferred embodiment, it is provided that the at least one valve and the proportional valve are arranged in a valve housing of a valve module. Even in the case of the multi-stage arrangement with at least two valves, such a module arrangement is advantageous since it offers the possibility of simple exchange and of adaptation to different applications.

In a further preferred embodiment, the proportional valve has a valve disc which is arranged in a flow path between the at least one valve and an outlet opening to the outlet, and can be pivoted by a stepper motor in order to assume the closed position and any desired open positions to close off or to open the flow path. The proportional valve may also have a safety spring which is connected to the valve disc and which exerts a force on the valve disc in the direction of the closed position of the valve disc. As a result of the valve which is connected upstream, it is possible for a proportional valve, which in this case has only a restricted sealing capability for lower pressures than the valve which is connected upstream, to be used primarily for pressure adjustment for a regulation of the outlet pressure, as a result of which installation space is saved. In the event of a failure of the stepper motor, the safety spring returns the valve disc into the closed position.

The at least one valve may be a diaphragm valve which is suitable for installation in a valve module.

The fresh-gas supply device may have at least one pressure sensor for measuring the outlet pressure and at least one pressure sensor for measuring an inlet pressure in the charge-air inlet, as a result of which the respective pressure value can be measured on location and may not be derived from other operating parameters. According to one advantageous variant, the pressure sensors may—though they need not be—integrated directly into the fresh-gas supply device. In an alternative embodiment, suitable measuring devices are arranged outside the fresh-gas supply device in order to measure the inlet pressure and outlet pressure. In a further alternative embodiment, the inlet pressure and outlet pressure can be calculated on the basis of operating parameters by use of suitable algorithms and/or stored table values. Here, the operating parameters may be existing values, for example from a central processor. The algorithms and/or table values may be a constituent part of an item of software of a control unit, for example of the engine control unit.

In a further alternative design, the at least two valves and/or the flap element can be adjusted in a continuously variable fashion between a closed position and an open position by electrical, mechanical and/or other measures. Here, the valves may likewise have equal-sized or different-sized flow cross-sections, thereby permitting a particularly high degree of variability for adjusting or regulating the outlet pressure. It is particularly advantageous if both the two valves and also the flap element are in each case adjustable in a continuously variable fashion, because a large range of adaptation to different operating states is provided in this way.

A method for regulating an outlet pressure in an outlet of a fresh-gas supply device having at least one valve and having a proportional valve connected downstream as described above has the following method steps:

(S1) determining an inlet pressure in a charge-air inlet and an outlet pressure in the outlet of the fresh-gas supply device, and operating parameters of an operating state of the internal combustion engine;

(S2) blocking the connection of the outlet to the charge-air inlet by closing the adjusting device, preferably the flap element, if one determined operating parameter or a plurality require an increased acceleration of the internal combustion engine;

(S3) opening the connection of the outlet to the compressed-air inlet by opening the at least one valve and the proportional valve during a pressure build-up phase and regulating the outlet pressure by comparing the outlet pressure with a nominal pressure by adjusting the proportional valve during a pressure-regulating phase; and (S4) closing the connection of the outlet to the compressed-air inlet by closing the at least one valve and the proportional valve and opening the connection of the outlet to the charge-air inlet by opening the adjusting device, preferably the flap element, if the inlet pressure has reached a defined and parameterizable value. This value may correspond, for example, to the outlet pressure or may be predetermined.

Here, the nominal pressure may be determined by the control device from the determined operating parameters and pressures on the basis of suitable algorithms and/or stored table values. This may take place in the control device or also in part in a superordinate engine controller. The adjustment of the proportional valve may also be adjusted by the control valve according to a look-up table. In this way, it is ensured that the respectively required fuel/air mixture is correctly set in all operating states of the internal combustion engine during the supply of compressed air, as a result of which there is no increased formation of NOx. Furthermore, as a result of air being saved, the power of the air compressor is not increased and therefore fuel is saved, since the air compressor is either directly connected to the internal combustion engine or is operated indirectly by electrical current, generated by said internal combustion engine, from a generator or a battery.

An alternative method for regulating an outlet pressure in an outlet of a fresh-gas supply device as described above having at least two valves has the following steps:

(S1) determining operating parameters of an operating state of the internal combustion engine;

(S2) blocking the connection of the outlet to the charge-air inlet by closing the adjusting device (closure device), preferably the flap element, if one determined operating parameter or a plurality require an acceleration of the internal combustion engine;

(S3) opening the connection of the outlet to the compressed-air inlet by fully opening the at least two valves in a pressure build-up phase and regulating the outlet pressure by comparing said pressure with a nominal pressure during a pressure-regulating phase by separately opening and closing the at least two valves or by adjusting at least one of the two valves between an open and closed position; and (S4) closing the connection of the outlet to the compressed-air inlet by closing the at least two valves and opening the connection of the outlet to the charge-air inlet by opening the adjusting device, preferably the flap element, if the inlet pressure has reached a defined and parameterizable value. This value may correspond, for example, to the outlet pressure or may be predetermined.

Here, the supply of compressed air may take place during every demand for acceleration or for a torque increase (also referred to as "kick-down"). It is however also contemplated to use the supply of compressed air only in the event of predefined demands, for example only during certain gear-shift processes.

Here, the nominal pressure may be determined by the control device from the determined operating parameters, or from all available operating parameters, on the basis of suitable algorithms and/or stored table values, as a result of which additional pressure sensors on the fresh-gas supply device are not necessary. The operating parameters may even contain such values directly or indirectly. Additional pressure sensors are of course also possible.

The at least two valves may be separately opened and closed, or at least one of the at least two valves may be adjusted between an open and closed position, by the control device according to a look-up table. For example, it is possible for this purpose for a particular activation/deactivation strategy or adjustment strategy to be predefined, and likewise stored in table values. The table values may be stored in the control device and/or externally, for example in the engine controller.

Instead of a flap element, it is also possible to use some other type of adjusting device, for example a slide element.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components or functional units with identical function are denoted by the same reference symbols in the figures.

FIG. 1 and FIG. 2 have already been described in the introduction and are not explained in any more detail here.

Figure 3:
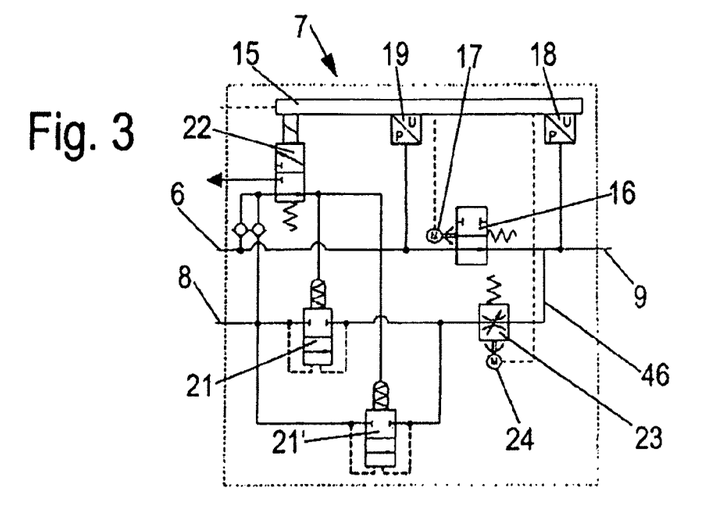
FIG. 3 is a schematic block circuit diagram of a first exemplary embodiment of a fresh-gas supply device according to the invention.

FIG. 3 shows a schematic block circuit diagram of a first exemplary embodiment of a fresh-gas supply device 7, wherein in contrast to the conventional fresh-gas supply device 7 according to FIG. 2, the flow-regulating valve 20 here has two valves 21, 21' with an associated control valve 22 and with a proportional valve 23. The proportional valve 23 is connected downstream in the flow direction and can be adjusted by a stepper motor 24. Here, the two valves 21, 21' are connected in parallel. The valves 21, 21' are preferably designed as supply valves and are activated and deactivated together by way of the control valve 22, which can be controlled electrically by the control device 15. When a supply of compressed air from the compressed-air inlet 8 is not required, the valves 21, 21' close off the compressed-air inlet 8, wherein in this state, the proportional valve 23 is not acted on with the pressure of the pressure inlet 8 and may be designed correspondingly. This proportional valve 23 is explained in more detail further below.

Figure 4:
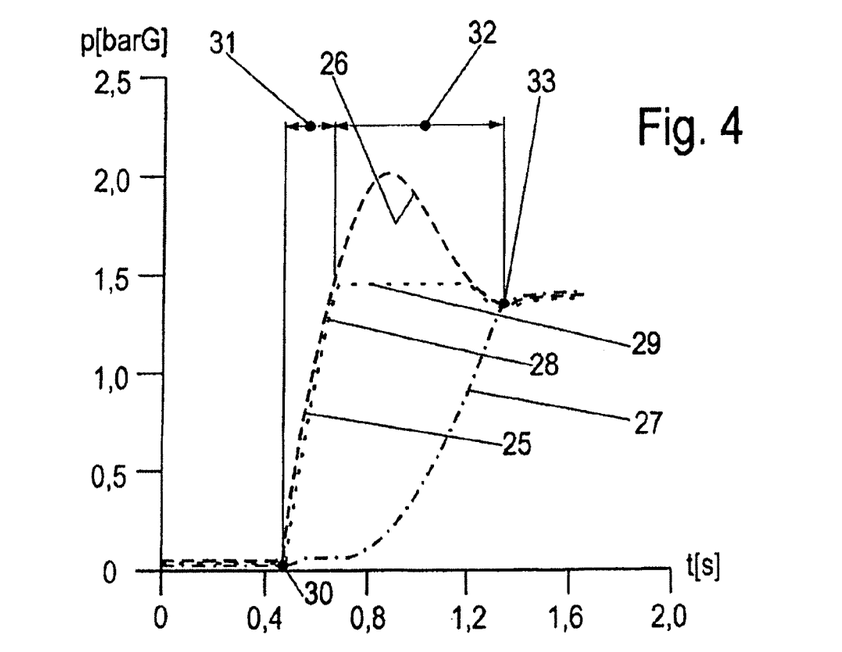
FIG. 4 is a graphic illustration of an outlet pressure.
Figure 7:
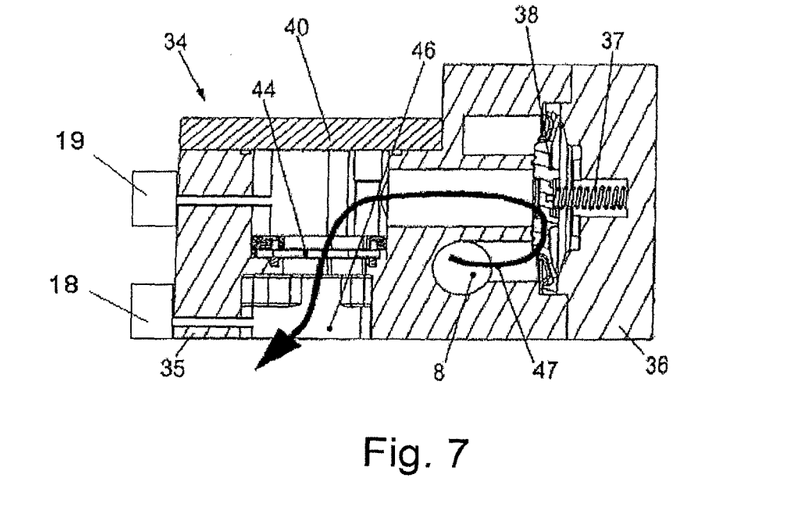
FIG. 7 is a schematic cross-sectional illustration of the valve module taken along the line Z-Z in FIG. 5.

With regard to function, reference is now made to FIG. 4. FIG. 4 is a graphic illustration of a first outlet pressure 25 in the outlet 9 of the fresh-gas supply device 7, plotted versus time t. In the event of a torque demand, which is determined by the control device 15 by monitoring pressure values of the charge-air inlet 6 (inlet pressure 27) and the outlet pressure 25 in the outlet 9 by the pressure sensors 18, 19 arranged on the fresh-gas supply device 7 or outside thereof as shown in FIG. 7, or else by other measuring devices (not shown), the control device 15 initially activates the adjusting motor 17 of the flap element 16 so as to close off the connection from the charge-air inlet 6 to the outlet 9. Here, the proportional valve 23 is opened by use of the stepper motor 24. The control valve 22 is then activated, as a result of which the valves 21, 21' open and thereby connect the compressed-air inlet 6 to the outlet 9 via the open proportional valve 23. A reaction of the compressed air now flowing into the outlet 9 on the charge-air inlet 6 is prevented by the closed flap element 16. Here, the outlet pressure 25 in the outlet 9 rises quickly, proceeding from a start of injection 30, to an excess pressure 26 (in this case approx. 2 bar) during a pressure build-up phase 31, which excess pressure 26 is supplied to the control device 15 by the first pressure sensor 18 and is compared with a nominal pressure 29 (in this example approx 1.5 bar) which can be preset. In this way, the proportional valve 23 is adjusted by way of the control device 15 so as to assume a smaller flow cross section, such that in a subsequent pressure-regulating phase 32, the outlet pressure 25 is adjusted to a nominal pressure 29 by means of the regulating loop. Without this regulation, the outlet pressure 25 would fully assume the excess pressure 26 and would fall again, which would result in a leaning of the fuel/air mixture and an increased delivery power of the air compressor 14.

At the start of the torque demand, the charge-air pressure which is delivered by the exhaust-gas turbocharger 2 and which is measured as an inlet pressure 27 in this example by the second pressure sensor 19, is still very low ("turbo lag"). The charge-air pressure then rises in the manner of a parabola, since the exhaust-gas turbocharger 2 accelerates and generates more charge air.

The pressure-regulating phase 32, in which the outlet pressure 25 is regulated to the nominal pressure 29, which virtually forms a constant value, runs up to the end of injection 33, when the inlet pressure 27 and the outlet pressure 25 substantially correspond. Or if the inlet pressure 27 has reached a defined and parameterizable value. This value may correspond, for example, to the outlet pressure or may be predetermined.

The reference symbol 28 denotes a profile of a nominal rise of the outlet pressure 25.

At the end of injection 33, the valves 21, 21' are closed, and the proportional valve 23 is likewise closed, with the flap element 16 being opened again.

Figure 5:
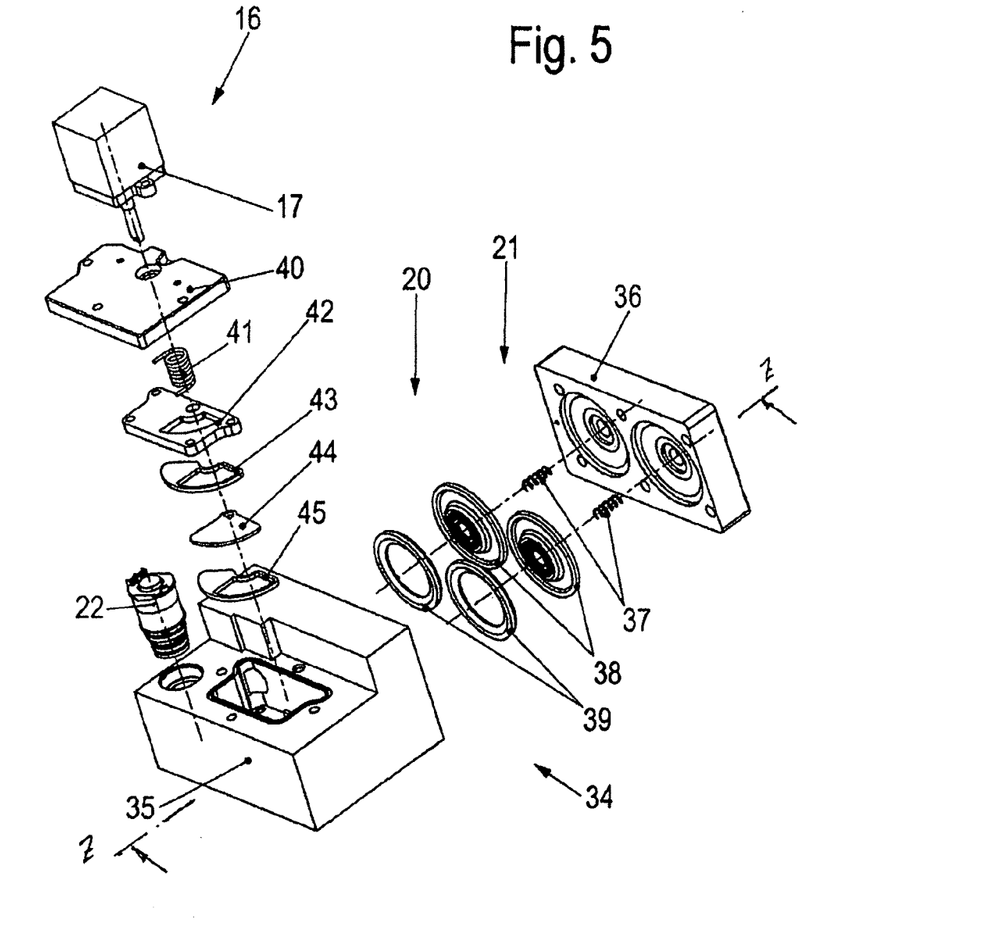
FIG. 5 is a perspective, exploded illustration of a valve module according to the first exemplary embodiment of FIG. 3.

The valves 21, 21', the proportional valve 23 with a stepper motor 24 and the control valve 22 are, in a preferred embodiment, arranged in a valve module 34 which is illustrated in FIG. 5 in a perspective exploded illustration. The valve module 34 has a valve housing 35 for holding the control valve 22, the proportional valve 23 and the valves 21, 21'. The valves 21, 21' are in this case designed as flat diaphragm valves with diaphragms 38, support rings 39 and diaphragm springs 37 which are arranged in the valve housing 35 and are closed off by a diaphragm cover 36. It is of course also possible to use other designs.

The proportional valve 23 has a variable flow cross section. The flow cross section (valve disc position) is adjusted dynamically as a function of the air demand of the internal combustion engine 1 (with the aim of a constant fuel/air mixture). The proportional valve 23 is adjusted by the stepper motor 24, by virtue of the stepper motor 24 directly pivoting a valve disc 44 which is connected to the shaft of the stepper motor 24. Once the end of injection 33 is reached, the proportional valve 23 is fully closed, with the valve module 34 thereby being separated from the intake line 9', that is to say from the outlet 9.

The primary sealing function of the proportional valve 23 is to prevent contents of the intake line 9' from infiltrating into the valve module 34. Furthermore, a safety spring 41 is coupled to the shaft of the stepper motor 23 or to the valve disc 44, as a result of which the valve disc 44 is pivoted back into the closed position, for example in the event of a power failure. The valve disc 44 is pivotably arranged between an upper seal 43 and a lower seal 45, with the upper seal 43 being held by a seal support plate 42 with an opening.

In this example, the seals 43, 45 and the seal support plate 42 are situated with the valve disc 44 within a corresponding recess of the valve housing 35, which is closed off by way of a valve cover 40. The stepper motor 24 is attached to the valve cover 40 from the outside, with the motor shaft extending through the valve cover 40 into the recess. To obtain good load bearing, sliding and sealing properties, the seals 43, 45 are for example coated with PTFE.

Figure 6:
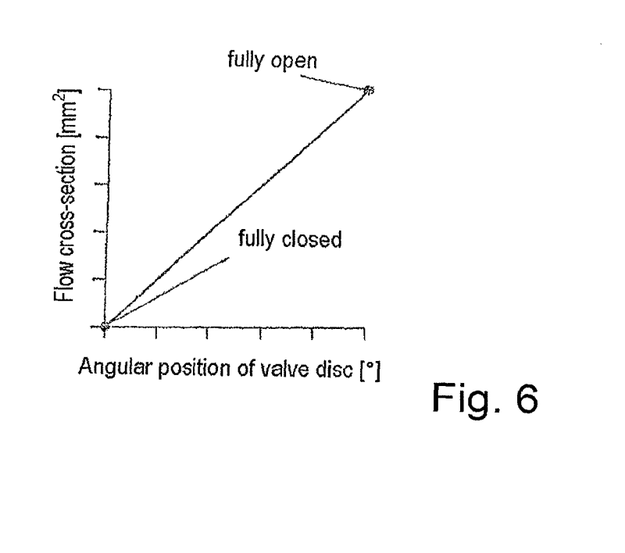
FIG. 6 is a graphic illustration of a flow cross-section of a proportional valve as a function of an angular position of a valve disc.

FIG. 6 shows a graphic illustration of a flow cross section of the proportional valve 23 as a function of an angular position of the valve disc 44. The proportional valve 23 and therefore the flow cross section are adjusted in a continuously variable fashion from a closed position to an open position and back in a manner proportional to the adjustment angle of the valve disc 44. Other relationships are likewise possible.

The control valve 22 is arranged, with its longitudinal axis parallel and adjacent to the proportional valve 23, in the valve housing 35, with the valves 21, 21' being formed into the valve housing 35 from one side with their longitudinal axis substantially at right angles. Other arrangements are possible. The valves 22 and 21, 21' and 23 are correspondingly connected to one another by means of ducts within the valve housing 35. The underside of the valve housing 35 (see FIG. 7) in this illustration can be attached to the fresh-gas supply device 7.

In this regard, FIG. 7 illustrates a schematic cross-sectional illustration of the valve module 34 along the line Z-Z in FIG. 5. A flow path 47 of the compressed air runs from the compressed-air inlet 8 through the open diaphragms 38 of the valves 21, 21', through a connecting duct through the open valve disc 44 of the proportional valve 23, and into an outlet connection 46 which communicates (in a way which is not shown) with the outlet 9 of the fresh-gas supply device 7. The diaphragm springs 37 exert a force on the diaphragms 38 in such a way that, in the non-actuated state, the diaphragms 38 close off the passage from the compressed-air inlet 8 to the proportional valve 23.

Figure 8:
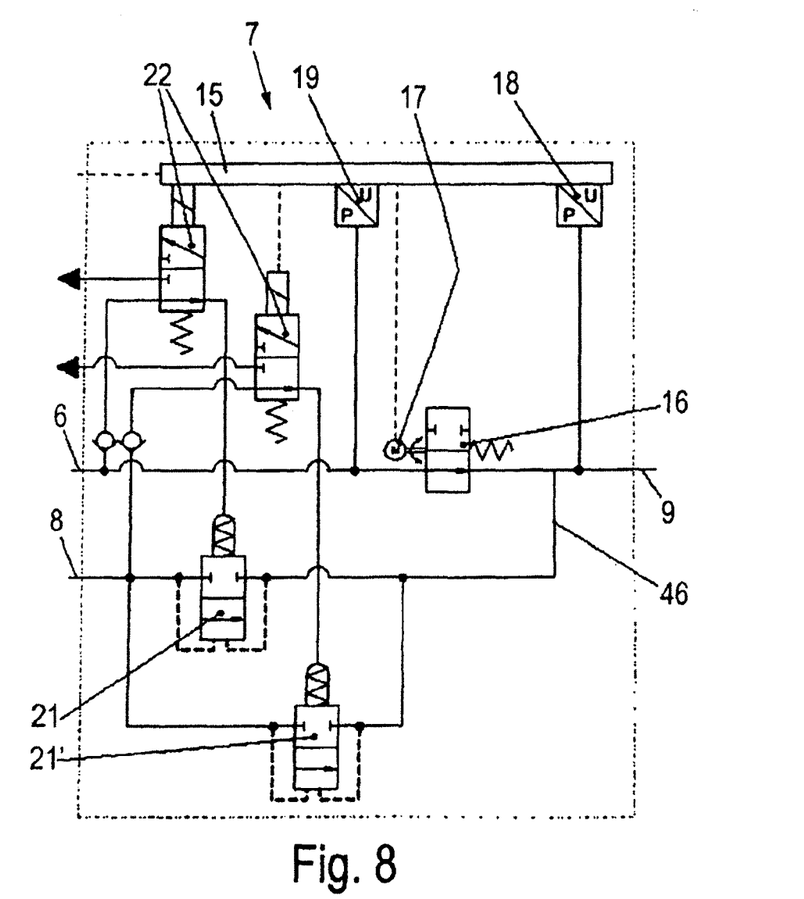
FIG. 8 is a schematic block circuit diagram of a second exemplary embodiment of the fresh-gas supply device according to the invention.

FIG. 8 shows a schematic block circuit diagram of a second exemplary embodiment of the fresh-gas supply device 7 according to the invention. The functional elements which have already been described with regard to FIG. 3 and are present here are not described again. Here, at least two valves 21, 21', preferably two high-pressure valves, are arranged parallel to one another between the compressed-air inlet 8 and the outlet 9. The valves 21, 21' can be controlled separately from one another by the control device 15 via in each case one control valve 22. In the second embodiment shown here, the valves 21, 21' have different flow cross sections $A_n$, specifically A1 and A2, as is schematically shown at the bottom of FIG. 9.

Figure 9:
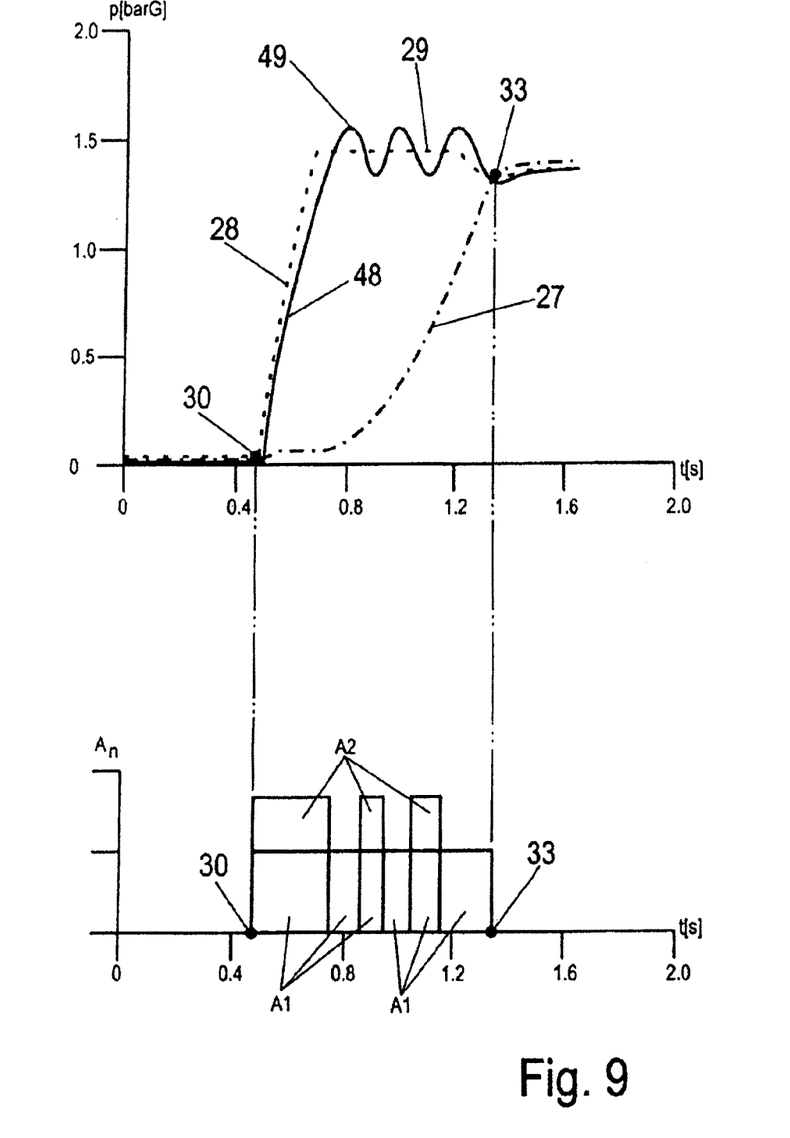
FIG. 9 is a graphic illustration of an outlet pressure, and associated flow cross sections of activated valves.

FIG. 9 shows a graphic illustration of a second outlet pressure 48 and associated flow cross sections An of activated valves 21, 21'. In the upper part of FIG. 9, a second outlet pressure 48 in the outlet 9 is plotted against the time t, with the lower part of FIG. 9 illustrating associated flow cross sections $A_n$ of activated valves 21, 22. The inlet pressure 27 has already been explained with regard to FIG. 4. The reference symbol 28 denotes the nominal rise of an ideal pressure rise in the outlet 9. The nominal pressure 29 is the nominal value (in this case in the region of 1.5 bar) which is used as a comparative value to an actual value of the second outlet pressure 48 (measured in the outlet 9) in order to determine an actuating variable for the flow cross section A of the valves 21, 21' in order to thereby adjust the second outlet pressure 48 to the nominal value 29. Here, pressure oscillations 49 about the nominal value 29 may occur during the course of the pressure-regulating phase 33 (see also FIG. 4) once the pressure rise has taken place. An excess pressure 26 as illustrated in FIG. 4, and the associated disadvantages, can however be avoided.

To obtain the desired flow cross section, the at least two valves 21, 21' are individually or simultaneously activated or deactivated separately from one another. Here, the at least two valves 21, 21' have different flow cross sections A1, A2, with A1 being greater than A2. At the start of injection 30, both flow cross sections A1, A2 are open, then A2 is intermittently closed, resulting in the pressure oscillation 49, which is illustrated here in exaggerated form. The two flow cross sections A1, A2 are then closed at the end of injection 33. The flow cross-sections A1, A2 may also be of equal size. The activation and deactivation times may also be varied. In the case of a relatively large number of valves 21, 21' with a plurality of different flow cross sections $A_n$ and different activation and deactivation times, a wider range of variations is possible, and finer regulation gradations and reduced pressure oscillations 49 of the second outlet pressure 48 are possible.

The overall flow cross section is defined so as to assist the maximum air consumption of the internal combustion engine, normally the waste gate actuation.

In the second exemplary embodiment, the at least two valves 21, 21' with associated control valves 22 may likewise be arranged in a valve module 34, similarly to the first exemplary embodiment.

The activation/deactivation sequence of the multi-stage valves 21, 21' takes place by means of a defined strategy, in which different outlet pressure characteristics are possible in a wide variation. Such strategies may for example be derived from a control or regulating strategy which utilizes all electrical/mechanical signals/parameters/programs which are available in the system of a vehicle belonging to the internal combustion engine 1. Here, it is possible to use look-up tables and further stored values/tables and the like. Such tables may be generated, adapted, modified or added to during adjustment or start-up phases of the internal combustion engine 1 or of its controller etc.

In the first exemplary embodiment, it is also possible to use only one valve 21 or a plurality thereof.

It is thus possible, for example, for at least one of the at least two valves 21, 21', preferably supply valves, of the second exemplary embodiment according to FIG. 8 to be adjustable in a fully variable or else stepped fashion between a closed position and an open position by mechanical, electrical or other means or a combination thereof, in such a way that a flow cross section is likewise adjustable in a fully variable or else stepped fashion, thereby enabling yet more versatile regulation and adaptation of the outlet pressure 48.

It is also contemplated for a valve 21, 21' to be of multi-stage design with equal-sized or different flow cross sections.

It is also an option for the inlet pressure 27 and the outlet pressure 25, 48 or only one of these to be determined mathematically on the basis of operating parameters. For example, the operating parameters may be calculated by the control device 15 by means of a suitable algorithm and/or stored table value.

It is also an option for the flap element 16 to be adjustable in a continuously variable fashion between a closed position and an open position by electrical, mechanical and/or other means. Here, several situations are possible, specifically in which either the two valves 21, 21' and the flap element 16 or only the flap element 16 or only the two valves 21, 21' are adjustable in a continuously variable fashion. If both the two valves 21, 21' and also the flap element 16 are adjustable in a continuously variable fashion, a very high possibility of variation and adaptability to a wide spectrum of operating states is realized.

| Table of Reference Symbols | |
|---|---|
| 1 | Internal combustion engine |
| 2 | Exhaust-gas turbocharger |
| 3 | Compressor |
| 4 | Exhaust-gas turbine |
| 5 | Charge-air cooler |
| 6 | Charge-air inlet |
| 7 | Fresh-gas supply device |
| 8 | Compressed-air inlet |
| 9 | Outlet |
| 9' | Intake line |
| 10 | Exhaust line |
| 11 | Intake air inlet |
| 12 | Exhaust-gas outlet |
| 13 | Tank |
| 14 | Air compressor |
| 15 | Control device |
| 16 | Flap element |
| 17 | Adjusting motor |
| 18 | First pressure sensor |
| 19 | Second pressure sensor |
| 20 | Flow-regulating device |
| 21, 21' | Valve |
| 22 | Control valve |
| 23 | Proportional valve |
| 24 | Stepper motor |
| 25 | First outlet pressure |
| 26 | Excess pressure |
| 27 | Inlet pressure |
| 28 | Nominal rise |
| 29 | Nominal pressure |
| 30 | Start of injection |
| 31 | Pressure build-up phase |
| 32 | Pressure-regulating phase |

-continued

Table of Reference Symbols

| | |
|---|---|
| 33 | End of injection |
| 34 | Valve module |
| 35 | Valve housing |
| 36 | Diaphragm cover |
| 37 | Diaphragm spring |
| 38 | Diaphragm |
| 39 | Support ring |
| 40 | Valve cover |
| 41 | Safety spring |
| 42 | Seal support plate |
| 43 | Upper seal |
| 44 | Valve disc |
| 45 | Lower seal |
| 46 | Outlet connection |
| 47 | Flow path |
| 48 | Second outlet pressure |
| 49 | Pressure oscillation |
| $A_n$ | Flow cross section |
| p | Pressure |
| t | Time |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating an outlet pressure in an outlet of a fresh-gas supply device, the method comprising the steps of:
determining operating parameters of an operating state of an internal combustion engine arranged downstream of the outlet of the fresh-gas supply device;
blocking a connection of the outlet to a charge-air inlet of the fresh-gas supply device by closing an adjusting device arranged in the connection of the outlet to the charge-air inlet if one or more determined operating parameters indicate an acceleration of the internal combustion engine is required;
opening a connection of the outlet to a compressed-air inlet by fully opening at least two valves between the outlet and the compressed air inlet in a pressure build-up phase;
regulating the outlet pressure after opening the connection of the outlet to the compressed-air inlet by comparing the outlet pressure with a nominal pressure during a pressure-regulating phase and by separately opening and closing the at least two valves or by adjusting at least one of the at least two valves between an open and closed position in response to the result of the comparison of the outlet pressure with the nominal pressure; and
when the inlet pressure has reached a defined and parameterizable value, closing the connection of the outlet to the compressed-air inlet by closing the at least two valves and opening the connection of the outlet to the charge-air inlet by opening the adjusting device.

2. The method according to claim 1, wherein the nominal pressure is determined by the control device from the determined operating parameters on the basis of algorithms and/or stored table values.

3. The method according to claim 1, wherein the nominal pressure is determined by the control device by determining an inlet pressure in the charge-air inlet and the outlet pressure in the outlet of the fresh-gas supply device, and from the determined operating parameters, on the basis of at least one of an algorithm and stored table values.

4. The method according to claim 3, wherein the at least two valves are separately opened and closed, or at least one of the at least two valves is adjusted between an open and closed position, by the control device according to a look-up table.

5. A method for regulating an outlet pressure in an outlet of a fresh-gas supply device, the method comprising the steps of:
determining an inlet pressure in a charge-air inlet and an outlet pressure in the outlet of the fresh-gas supply device with pressure sensors;
determining operating parameters of an operating state of an internal combustion engine arranged downstream of the outlet of the fresh-gas supply device;
blocking a connection of the outlet to the charge-air inlet by closing an adjusting device arranged in the connection of the outlet to the charge-air inlet if one or more determined operating parameters require an increased acceleration of the internal combustion engine;
opening a connection of the outlet to the compressed-air inlet by opening at least one valve and a proportional valve during a pressure build-up phase;
regulating the outlet pressure after opening the connection of the outlet to the compressed-air inlet by comparing the outlet pressure with a nominal pressure and by adjusting the proportional valve during a pressure-regulating phase in response to the result of the comparison of the outlet pressure with the nominal pressure; and
when the inlet pressure has reached a defined and parameterizable value, closing the connection of the outlet to the compressed-air inlet by closing the at least one valve and the proportional valve and opening the connection of the outlet to the charge-air inlet by opening the adjusting device.

6. The method according to claim 5, wherein the nominal pressure is determined by the control device from the determined operating parameters and pressures on the basis of algorithms and/or stored table values.

7. The method according to claim 6, wherein the proportional valve is adjusted by the control device according to a look-up table.

8. A fresh-gas supply device for use in an internal combustion engine having an exhaust-gas turbocharger, comprising:
a charge-air inlet for admission of charge air from the exhaust-gas turbocharger;
a compressed-air inlet for admission of compressed air;
an outlet connectable via an adjusting device to the charge-air inlet and via a flow-regulating device to the compressed-air inlet, the flow-regulating device being closed when the adjusting device is partially open or fully open; and
a control device for controlling the adjusting device and the flow-regulating device as a function of operating states of the internal combustion engine,
wherein the flow-regulating device has at least two valves for opening and for closing off the compressed-air inlet and for adjusting the outlet pressure in the outlet, said at least two valves being controllable separately by the control device via in each case one control valve.

9. The fresh-gas supply device according to claim 8, wherein the at least two valves have equal-sized flow cross sections.

10. The fresh-gas supply device according to claim 8, wherein the at least two valves have different-sized flow cross sections.

11. The fresh-gas supply device according to claim 8, wherein the at least two valves and/or the adjusting device is adjustable in a continuously variable fashion between a closed position and an open position by one of electrical and mechanical mechanisms.

12. The fresh-gas supply device according to claim 8, wherein the fresh-gas supply device has at least one pressure sensor for measuring an outlet pressure in the outlet and at least one pressure sensor for measuring an inlet pressure in the charge-air inlet.

13. The fresh-gas supply device according to claim 8, wherein an outlet pressure and an inlet pressure in the charge-air inlet are measurable by measuring devices arranged outside the fresh-gas supply device.

14. The fresh-gas supply device according to claim 8, wherein an outlet pressure and an inlet pressure in the charge-air inlet are calculatable on the basis of operating parameters by use of at least one of an algorithm and stored table values.

15. A fresh-gas supply device for use in an internal combustion engine having an exhaust-gas turbocharger, comprising:
- a charge-air inlet for admission of charge air from the exhaust-gas turbocharger;
- a compressed-air inlet for admission of compressed air;
- an outlet connectable via an adjusting device to the charge-air inlet and via a flow-regulating device to the compressed-air inlet, the flow-regulating device being closed when the adjusting device is partially open or fully open; and
- a control device for controlling the adjusting device and the flow-regulating device as a function of operating states of the internal combustion engine,
- wherein the flow-regulating device has at least one valve for opening and for closing off the compressed-air inlet and has a proportional valve, which is connected downstream in the flow direction, for adjusting an outlet pressure in the outlet.

16. The fresh-gas supply device according to claim 15, wherein the at least one valve and the proportional valve are arranged in a valve housing of a valve module.

17. The fresh-gas supply device according to claim 16, wherein the at least one valve is controllable by the control device via a control valve.

18. The fresh-gas supply device according to claim 17, wherein the control valve is arranged in the valve housing of the valve module.

19. The fresh-gas supply device according to claim 18, wherein the proportional valve has a valve disc which is arranged in a flow path between the at least one valve and an outlet opening to the outlet, and is pivotable by a stepper motor in order to assume the closed position and any desired open positions to close off or to open the flow path.

20. The fresh-gas supply device according to claim 19, wherein the proportional valve has a safety spring which is connected to the valve disc and which exerts a force on said valve disc in a direction of the closed position of the valve disc.

21. The fresh-gas supply device according to claim 15, wherein the at least one valve is a diaphragm valve.

22. The fresh-gas supply device according to claim 15, wherein the fresh-gas supply device has at least one pressure sensor for measuring the outlet pressure and at least one pressure sensor for measuring an inlet pressure in the charge-air inlet.

23. The fresh-gas supply device according to claim 15, wherein an outlet pressure and an inlet pressure in the charge-air inlet are measurable by measuring devices arranged outside the fresh-gas supply device.

24. The fresh-gas supply device according to claim 15, wherein an outlet pressure and an inlet pressure in the charge-air inlet are calculatable on the basis of operating parameters by use of at least one of an algorithm and stored table values.

* * * * *